United States Patent Office 3,325,357
Patented June 13, 1967

3,325,357
EFFERVESCENT MEDICINAL COMPOSITIONS
Riyad R. Irani, St. Louis, Mo., assignor to Monsanto Company, St. Louis, Mo., a corporation of Delaware
No Drawing. Filed May 28, 1965, Ser. No. 459,913
10 Claims. (Cl. 167—57)

This invention relates generally to effervescent therapeutic or medicinal compositions and, more particularly, to effervescent therapeutic or medicinal compositions containing a novel acidulating agent and especially such compositions in tablet form.

Effervescent medicinal compositions which produce a lively effervescence when added to water contain, in addition to aspirin and a carbonate-containing material, an organic acid, such as the commonly used citric acid, with the acid being present to, among other things, react with the carbonate-containing material to release carbon dioxide which produces the desired effervescence. As is well known, however, the commonly used organic acids all have limitations such as, for example, citric acid is hygroscopic, which oftentimes presents problems in their use or seriously restricts their use. As can be appreciated, therefore, an organic acidulating agent which can be used in effervescent medicinal compositions and which minimizes or obviates the limitations of conventionally used organic acids, such as citric acid, would represent an advancement in this art.

It is, therefore, an object of the present invention to provide effervescent medicinal compositions containing a novel acidulating agent.

Another object of the present invention is to provide effervescent medicinal compositions in tablet form containing a novel acidulating agent.

A still further object of the present invention is to provide an organic acidulating agent as an additive in effervescent medicinal compositions and especially such compositions in tablet form which minimizes or obviates the limitations of conventionally used organic acids, such as citric acid.

The above objects, as well as other objects of this invention, can be accomplished by incorporating into effervescent medicinal compositions containing aspirin and a carbonate-containing material an amino tri(lower alkylidene phosphonic acid) having the formula:

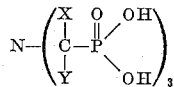

wherein X and Y are members selected from the group consisting of hydrogen and lower alkyl groups (1–4 carbon atoms), their acid salts and mixtures thereof.

Amino tri(lower alkylidene phosphonic acid) compounds illustrative of the invention include:

(1) amino tri(methylene phosphonic acid)
(2) amino tri(ethylidenephosphonic acid)
(3) amino tri(isopropylidenephosphonic acid)
(4) amino tri(butylidenephosphonic acid)
(5) amino mono(ethylidenephosphonic acid) di(methylene phosphonic acid)
(6) amino di(methylenephosphonic acid) mono(isopropylidene phosphonic acid)
(7) amino di(methylenephosphonic acid) mono(butylidene phosphonic acid)

The amino tri(lower alkylidene phosphonic acids) can be advantageously used in effervescent medicinal compositions because such are, among other things, some of the strongest organic acids known, can be readily formulated into effervescent medicinal compositions and are compatible in such compositions, and are non-hygroscopic and readily soluble in both hot and cold water.

The amino tri(lower alkylidene phosphonic acids) may be prepared by various means, one of which comprises reacting ammonia, a suitable carbonyl compound (ketone or aldehyde) and orthophosphorous acid preferably at elevated temperatures (about 70–200° C.) and in an aqueous medium having a pH below about 4 and preferably in the presence of a halide compound such as HCl.

Although the amino tri(lower alkylidene phosphonic acid) compounds are preferred for use in the effervescent medicinal compositions, any water-soluble acid salt of the phosphonic acid compounds may, in general, be employed as well as mixtures of various acid salts and/or the free acid and acid salts in practicing the present invention. Of the water-soluble acid salts of the amino tri (lower alkylidene phosphonic acid) the di-metal salts are preferred, especially the dialkali metal salts, and in particular, the disodium salts, although other alkali metal salts, such as potassium, lithium and the like, as well as mixtures of the alkali metal salts, may be substituted therefor. Other water-soluble acid salts which may be employed in practicing the present invention include the ammonium salts and amine salts, particularly when the amine is a low molecular weight amine, i.e., having a molecular weight below about 300, and more particularly the alkyl amines, alkylene amines and alkanol amines containing not more than 2 amine groups, such as, ethylamine, diethyl amine, propylamine, propylene diamine, hexylamine, 2-ethyl hexylamine, N-butyl ethanol amine, triethanol amine and the like. In general, the acid salts may be prepared by neutralizing the free phosphonic acid compounds with a base that contains essentially the desired cation. For example, to prepare a disodium salt, one of the phosphonic acid compounds can be neutralized with a stoichiometric amount of a base containing the sodium cation, such as NaOH, Na$_2$CO$_3$ and the like.

The carbonate-containing materials which may, in general, be employed in practicing the present invention are compounds containing essentially carbonate which are capable of reacting with the phosphonic acid compounds with the release of carbon dioxide when contacted with sufficient water. In particular the inorganic carbonates, and more particularly the alkali metal carbonate materials, such as, sodium carbonate, sodium bicarbonate, sodium sesquicarbonate, potassium carbonate, potassium bicarbonate, lithium carbonate, lithium bicarbonate, ammonium carbonate, ammonium bicarbonate, ammonium sesquicarbonate, and the like including mixtures of these. Ammonia is included herein as an alkali metal in view of the fact that the ammonium salts exhibit substantially the same chemical properties as the alkali metal salts such as the sodium and potassium salts.

In general, amounts of the phosphonic acid, carbonate-containing material and aspirin can vary depending upon, inter alia, desired degree of effervescence, other additives used and the like; however, amounts of the phosphonic acid to carbonate-containing material on a weight ratio basis of from about 3:1 to 1:3 are usually sufficient with amounts from about 1:1.5 to 1.5:1 being preferred. Amounts of aspirin to the effervescent factor (phosphonic acid and carbonate-containing material) on a weight ratio basis of from about 1:50 to 1:1 are usually sufficient with from about 1:5 to 1:15 being preferred.

The invention is not to be limited to any particular method of preparing the effervescent medicinal composition. The phosphonic acid material may be mechanically mixed with the other additives, such as the carbonate-containing material and aspirin, or added simultaneously or separately to the water in which the composition is to be used.

A preferred embodiment of the present invention is an effervescent medicinal tablet. The tablet may be prepared by various methods such as, compacting the dry, freeflowing effervescent medicinal composition in a suitable mold under sufficient pressure in order for the tablet to retain its shape and have sufficient surface and internal strength to withstand ordinary handling and packaging without fracturing or crumbling. Usually pressures in excess of about 2,000 p.s.i. are suitable and, in general, the pressures need not be in excess of about 20,000 p.s.i., although pressures in excess may, in some instances, be used. Additionally, if desired, lubrication agents or binding agents, such as sugar, acacia, gelatin or lactose, can be used as well as heat treatments in order to prepare the compositions in tablet form. The tablets of the present invention may be made of various shapes and sizes depending upon the particular purpose for which they may be used.

In addition to the phosphonic acid component, the carbonate-containing material and aspirin, the effervescent medicinal composition may also include other conventional additives in such compositions usually in minor amounts, amounts less than 50% by weight of the composition, and, more particularly, in amounts from about 0.5% to about 10% which include buffer salts such as the alkali metal and alkaline earth metal phosphates, phenacetin, acetyl p-aminophenol, sodium bromide, potassium bromide, caffeine as well as various other therapeutic ingredients which are to be administered in the form of an aqueous carbonated drink. Flavoring and sweetening agents may also be added.

The effervescent medicinal compositions of the present invention are generally effective when used in water in conventional amounts such as about 3 to 4 grams per 8 ounces of water.

In order to illustrate the advantages of the effervescent medicinal composition of the present invention the following compositions were prepared:

*Composition A*

| Additive: | Amount (parts by weight) |
|---|---|
| Amino tri(methylene phosphonic acid) | 1.13 |
| Acetyl salicyclic acid (aspirin) | 0.32 |
| Sodium bicarbonate | 1.95 |
| Monocalcium phosphate | 0.10 |
| | 3.50 |

*Composition B*

| | |
|---|---|
| Citric acid | 1.13 |
| Acetyl salicyclic acid (aspirin) | 0.32 |
| Sodium bicarbonate | 1.95 |
| Monocalcium phosphate | 0.10 |
| | 3.50 |

In one experiment the above formulations were prepared by ball-milling the above additives for about 10 minutes and then tablet samples were prepared weighing about 3.50 grams [.50″ thickness x 1.15″ (dia.)] by pressing the admixed formulation into a suitable mold at pressures of about 5,000 p.s.i. for about 3 minutes.

The tablets were allowed to drop into 200 ml. distilled water (25° C.) and the time required for the tablet to completely disintegrate was noted as well as the pH of the solutions. For Composition A the dissolution rate was about 44 sec. and the pH of the solution was about 6.05. For Composition B the dissolution rate was about 47 sec. and the pH of the solution was about 5.95. As can be appreciated from the foregoing, effervescent medicinal tablets containing a phosphonic acid of the present invention exhibits improved dissolution when compared to tablets containing the commonly used citric acid.

In another experiment the above formulations were prepared by ball-milling the above additives for about 10 minutes and then tablet samples were prepared weighing about 3.50 grams [.50″ thickness x 1.15″ (dia.)] by pressing the admixed formulation into a suitable mold at pressures of about 10,000 p.s.i. or 20,000 p.s.i. for about 3 minutes.

The tablets were exposed to a relatively stringent relative humidity level of 69% at 90° F. for extended periods of time. The rate of weight change was noted, as well as the visual characteristics of the tablet. The following table presents the results.

TABLE 1

| Exposure Time (hours) | Composition A | | | | Composition B | | | |
|---|---|---|---|---|---|---|---|---|
| | Percent Loss or Gain | | Visual | | Percent Loss or Gain | | Visual | |
| | (1) | (2) | (1) | (2) | (1) | (2) | (1) | (2) |
| 16 | −7.1 | −9.3 | Slight attack | No change | −21.3 | −21.3 | Disintegrated | Disintegrated. |
| 24 | −6.0 | | do | do | −21.4 | | do | Do. |
| 40 | | −6.8 | do | do | −21.4 | −21.3 | do | Do. |

Note.—(1) Pressed at 10,000 p.s.i. (2) Pressed at 20,000 p.s.i.

As can be observed from the foregoing table, Composition A (containing a phosphonic acid of the present invention) exhibits appreciably better stability to humidity conditions then Composition B (containing the commonly used citric acid) and, in fact, under such conditions the tablets of Composition B completely distintegrated.

In addition, good results can also be obtained by using substantially similar amounts of other amino tri(lower alkylidene phosphonic acids) in the foregoing example, such as, amino tri(ethylidene phosphonic acid), amino tri(butylidene phosphonic acid), amino mono(ethylidene phosphonic acid), di(methylene phosphonic acid) and amino di(methylene phosphonic acid)mono(propylidene phosphonic acid), as well as the water-soluble acid salts of the foregoing acids and amino tri(methylene phosphonic acid), particularly disodium amino tri (methylene phosphonate).

If desired, the phosphonic acids of the present invention can be used with other organic acids, such as citric, fumaric, tartaric, malic, and lactic acids. Usually amounts on a weight ratio basis of any of the foregoing acids or mixtures thereof to the phosphonic acid of from about 100:1 to 1:100 are sufficient with from about 10:1 to 1:10 being preferred.

What is claimed is:

1. An effervescent medicinal composition comprising aspirin, a carbonate-containing material and an acidulating agent selected from the group consisting of amino tri (lower alkylidene phosphonic acid), its water-soluble acid salts and mixture thereof; said carbonate-containing material and said acidulating agent being in a weight ratio of from about 3:1 to 1:3.

2. The composition of claim 1, wherein said composition is in tablet form.

3. An effervescent medicinal composition comprising aspirin, a carbonate-containing material and an acidulating agent selected from the group consisting of amino tri (methylene phosphonic acid), its water-soluble acid salts and mixtures thereof; said carbonate-containing material and said acidulating agent being in a weight ratio of from about 3:1 to 1:3.

4. The composition of claim 3, wherein said composition is in tablet form.

5. The composition of claim 3, wherein said aspirin is present on a weight basis to said acidulating agent and said carbonate-containing material of from about 1:50 to 1:1.

6. The composition of claim 5, wherein said acidulating agent is amino tri(methylene phosphonic acid).

7. The composition of claim 6, wherein said carbonate-containing material is sodium bicarbonate.

8. The composition of claim 7, wherein said composition is in tablet form.

9. An effervescent medicinal composition comprising in combination the following additives in approximate amounts on a parts by weight basis:

| Additive: | Amounts |
|---|---|
| Amino tri(methylene phosphonic acid) | 1.13 |
| Aspirin | 0.32 |
| Sodium bicarbonate | 1.95 |
| Monocalcium phosphate | 0.10 |

10. The composition of claim 9, wherein said composition is in tablet form.

No references cited.

ALBERT T. MEYERS, *Primary Examiner.*

S. SINGER, *Assistant Examiner.*